Dec. 14, 1965          H. E. KIERNAN          3,222,802
SELF-PROPELLED VEHICLE AND MOUNTING FOR TOOL OR IMPLEMENT
Filed Feb. 12, 1963          4 Sheets-Sheet 3
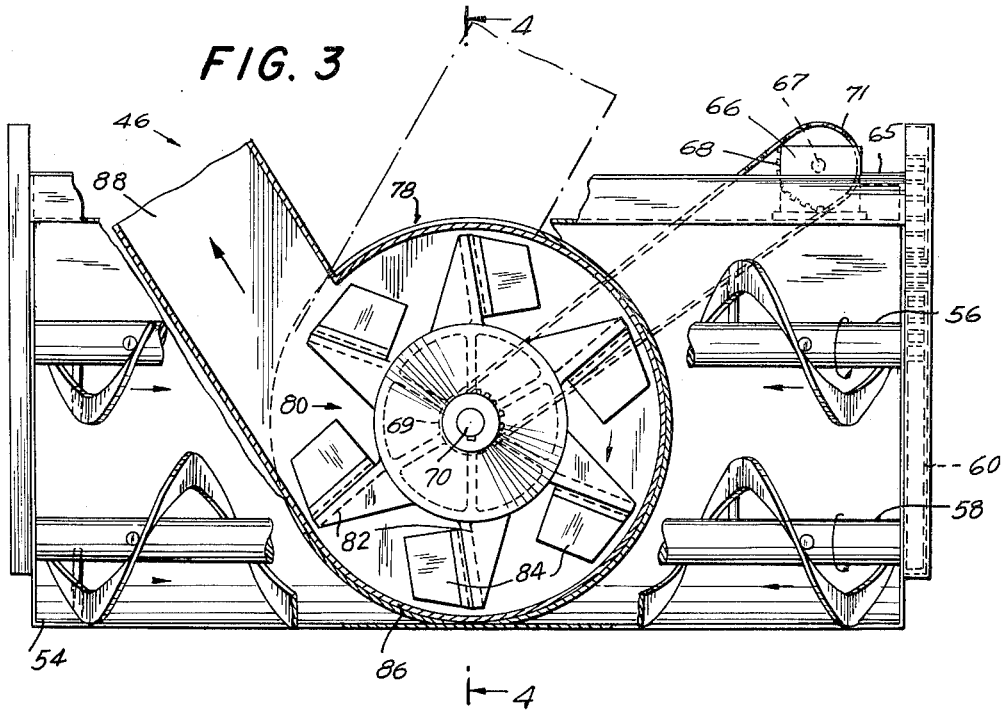
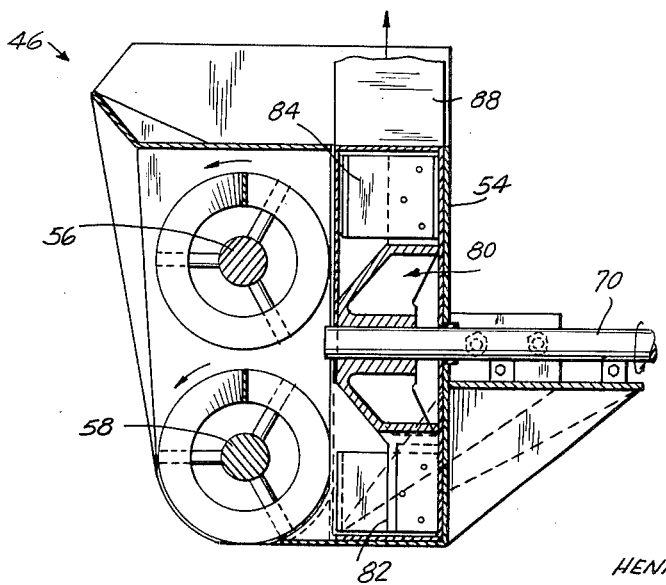
INVENTOR.
HENRY E. KIERNAN
BY
Kane, Dalsimer and Kane
ATTORNEYS Dec. 14, 1965  H. E. KIERNAN  3,222,802
SELF-PROPELLED VEHICLE AND MOUNTING FOR TOOL OR IMPLEMENT
Filed Feb. 12, 1963  4 Sheets-Sheet 4

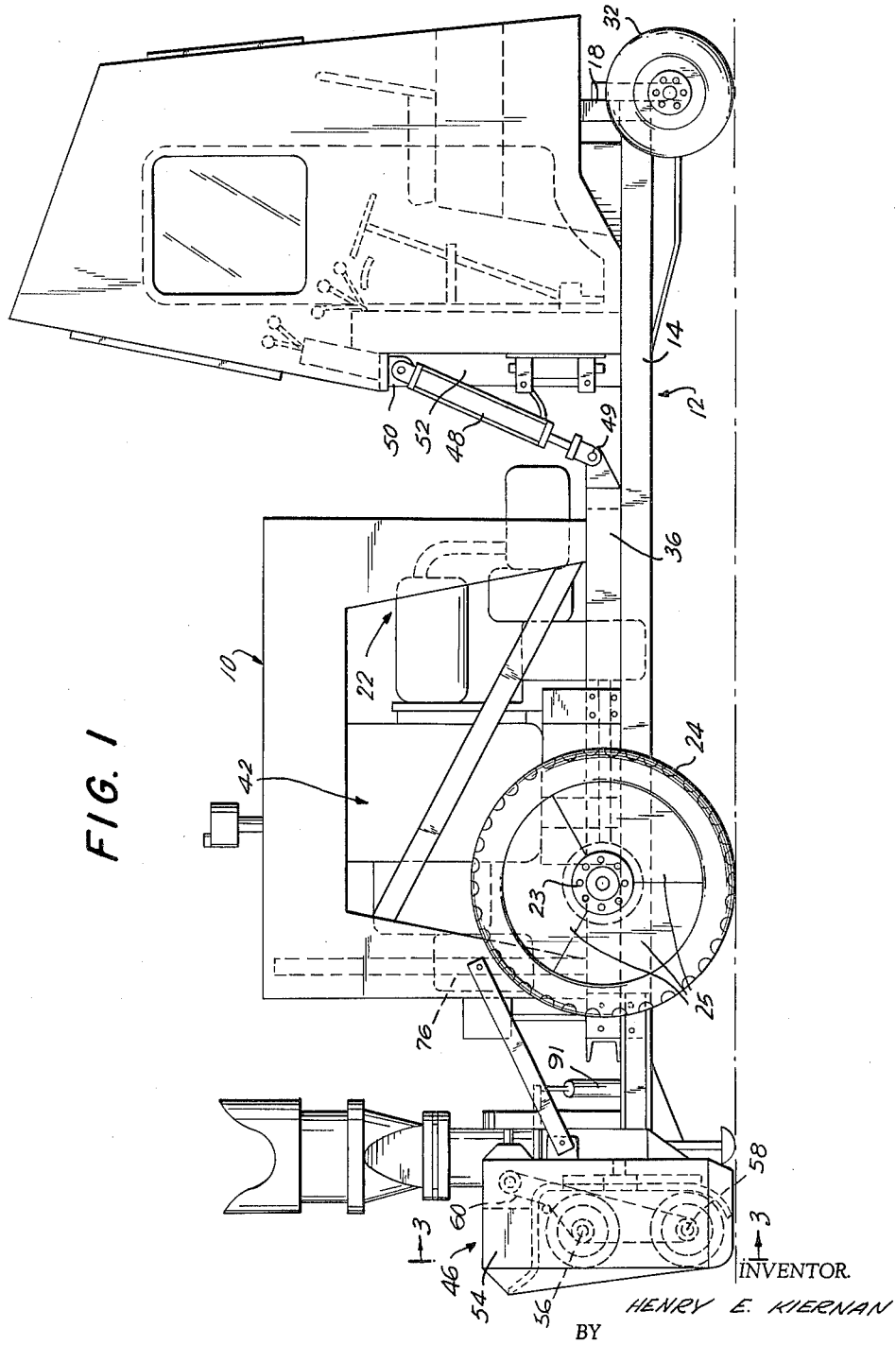

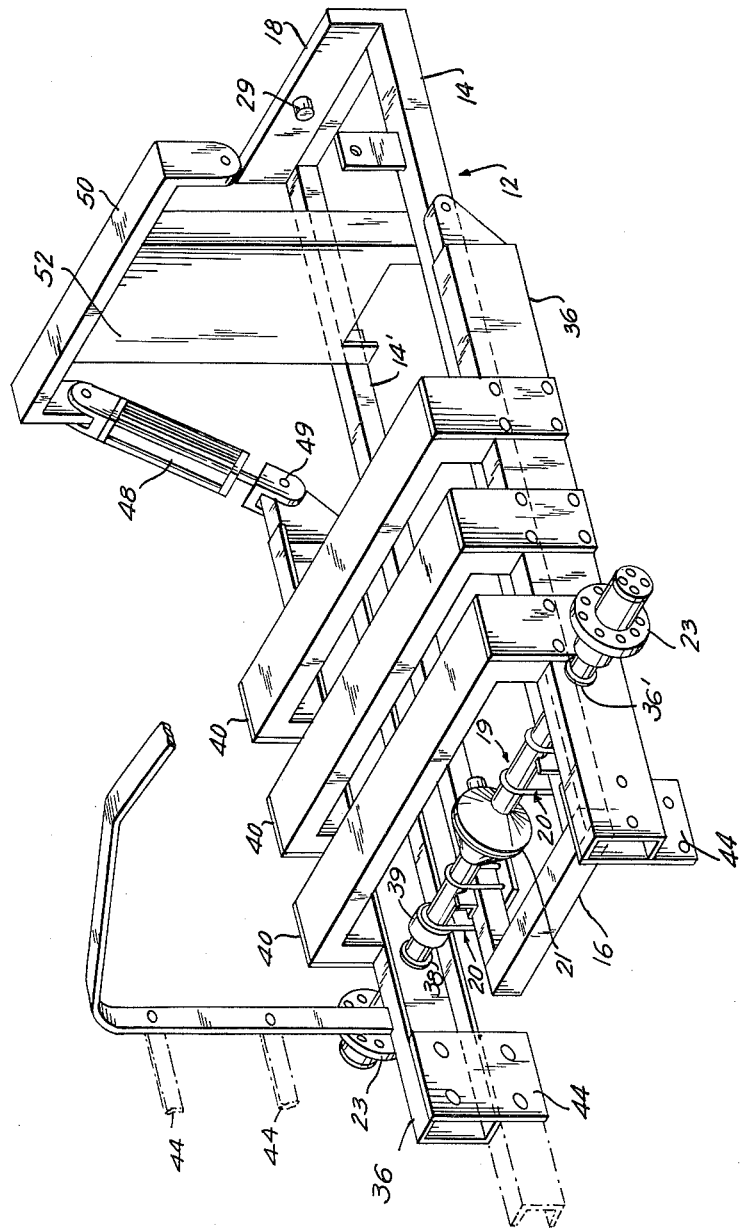

INVENTOR.
HENRY E. KIERNAN
BY
Kane, Dalsimer and Kane
ATTORNEYS

United States Patent Office 3,222,802
Patented Dec. 14, 1965

3,222,802
SELF-PROPELLED VEHICLE AND MOUNTING
FOR TOOL OR IMPLEMENT
Henry E. Kiernan, 136 W. Pulaski Road,
Huntington Station, N.Y.
Filed Feb. 12, 1963, Ser. No. 258,051
3 Claims. (Cl. 37—43)

This invention relates to a self-propelled vehicle of the type having a mounting for a tool or implement and more particularly to a self-propelled vehicle of the type having front wheel drive in which the load is concentrated over the front wheels of the vehicle.

Self-propelled vehicles of the type on which implements such as snowblowers are mounted, generally are constructed with rear wheel drives in which the load is centered toward the rear of the vehicle with the load being mounted on a single rigid frame. Construction of this type generally has many disadvantages, i.e., the load which is being centered rearwardly causes inefficient operation of the tool or implement which results in loss or waste of available power output and high maintenance cost. This type of front wheel steering does not permit ease of maneuverability of the vehicle.

It is a prime object of my invention to overcome the difficulties and disadvantages heretofore encountered and to provide a self-propelled vehicle of the type on which implements such as snowblowers are mounted in which the snowblower or other implement may be efficiently operated without loss or waste of available power output and at a minimum maintenance cost.

A further object of my invention is to provide a self-propelled vehicle of the above type which is readily manueverable and easy to steer. It is also an object of my invention to provide an improved self-propelled vehicle of the above type in which the operation of the snowblower or other implement is independent of the speed or operation of the vehicle itself.

My invention contemplates a self-propelled vehicle of the type having a mounting for an implement such as a snowblower that is shiftable between elevated and lowered positions. The vehicle includes a primary rigid frame supported by front and rear wheels and axle assemblies, an auxiliary frame mounted longitudinally of the primary frame and pivotally mounted to the front axle assembly intermediate the ends of the auxiliary frame, means for mounting a prime mover thereon rearwardly of the axle assembly, and means for mounting and operably connecting a tool or implement forwardly of the axle assembly whereby the implement is counterbalanced by the prime mover so that the load is centered over the axle assembly.

My invention also contemplates providing a transmission between the prime mover and the vehicle for operating the vehicle and a separate and independent power take-off for operating the snowblower or other implement independently of the speed or operation of the vehicle.

Other objects and advantages of my invention will be apparent from the following specification and drawings which disclose a preferred embodiment of my invention:

FIG. 1 is a side elevational view of my self-propelled vehicle in full assembly;

FIG. 2 is a perspective view of the compound chassis construction;

FIG. 3 is a longitudinal cross-sectional view of the snowblower taken on a line 3—3 of FIG. 1;

FIG. 4 is a transverse vertical sectional view of the snowblower taken along line 4—4 of FIG. 3;

Figure 5:
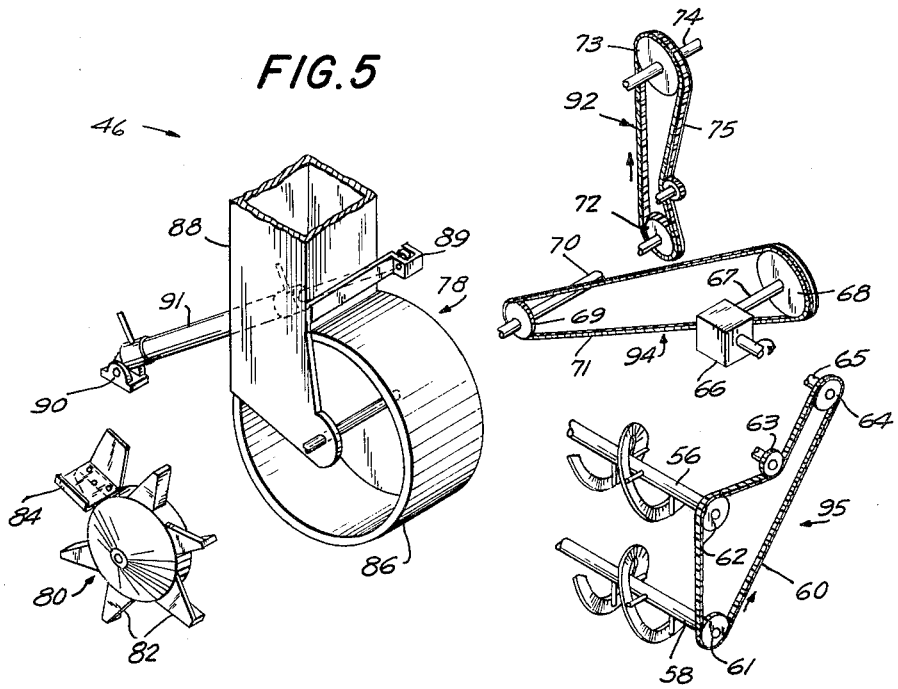
FIG. 5 is an exploded view in perspective of my snowblower.
Figure 6:
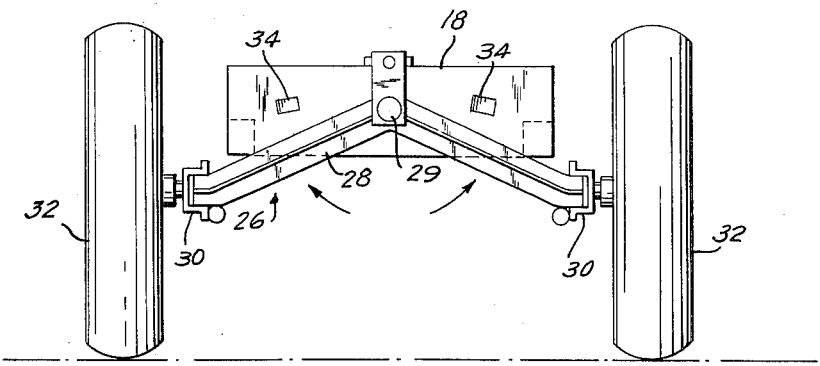
FIG. 6 is an elevational view of the rear wheel assembly.

My self-propelled vehicle is generally designated by numeral 10 and comprises a primary rigid frame 12 which extends longitudinally thereof. Frame 12 includes a pair of longitudinal members 14 and 14' and mounted at the ends thereof are cross-members 16 and 18. Axle assembly 19 is detachably mounted on frame members 14 and 14' adjacent cross member 16 by U-bolt assembly 20. Axle assembly 19 includes a drive means 21 operably connected to a hydrostatic transmission 22 of well-known type. Transmissions of this type provide a fluid power in which there are no frictionally engaging parts that would require maintenance or other repairs. There is no clutch or brake to burn out and no gears to engage for forward or reverse speeds. This type of drive means permits the operator to develop full power at near zero m.p.h. with no danger of damaging the transmission 22. At the ends of axle assembly 19, means 23 are provided for mounting wheels 24 to support the front end of vehicle 10. Detachably mounted on wheels 24 are weights 25 which increase the load placed on axle assembly 19. The increased load reduces the necessity for chains on tires for use in snow.

Rear axle assembly 26 is pivotally mounted on cross-member 18 of frame 12. Rear axle 28 is of unitary construction and angularly formed, projecting outwardly and downwardly from frame 12 and mounted on pin 29 so that axle 28 may pivot thereon. Wheel mounting means 30 are provided at the ends of axle 28 for mounting wheels 32 to support the rear of frame 12 of vehicle 10. The wheel mounting means 30 are operably connected to the steering mechanism of vehicle 10 so that wheels 32 turn around vertical axes for steering. The rear wheels 32 and axle assembly 26 provide a means whereby the frame 12 will remain substantially parallel to the terrain so that only the rear axle assembly 26 will shift radially about pin 29. Stops 34 are rigidly mounted on cross-member 18 and are engageable by axle 28 to confine the arcuate movements of axle assembly 26 within the indicated limits.

Auxiliary frame 36 is pivotally mounted on front axle assembly 19 through openings 36'. Openings 36' have a sleeve bearing 38 rigidly mounted therein so that bearing 38 engages front axle assembly 19 providing a surface in which auxiliary frame 36 shifts radially thereon. To prevent auxiliary frame 36 from shifting axially on axle assembly 19, stops 39 are provided. Prime mover mounting means 40 are spaced rearwardly of axle assembly 19 and are rigidly mounted on frame 36. The prime mover 42 and hydrostatic transmission 22 are detachably mounted on mounting means 40. A tool or implement is detachably mounted on the forward end of frame 36 at points 44.

In the drawings, snowblower 46 as described below, is operatively connected to vehicle 10 on frame 36. In this connection, the weight of the snowblower 46 is counterbalanced by the prime mover 42 and the transmission assembly 22 so that the load is substantially centered over the front axle assembly 19. Frame 36 is hydraulically operated through cylinders and pistons 48 of which the cylinder is pivotally connected to flanged member 50 and the piston is pivotally connected to auxiliary frame 36 at 49. Flanged member 50 is rigidly connected to support panel 52, which is rigidly connected to frame 12. When cylinders and pistons 48 are hydraulically operated and are at full stroke, the rear of frame 36 shifts downwardly so that the tool or implement is in an elevated position. When cylinders and pistons 48 are at minimum stroke, the frame 36 shifts upwardly so that the tool or implement is in a lowered position and will raise the front wheels 24 from the contacting surface, thus providing a built-in jack means for the vehicle. It is obvious when vehicle 10 is propelled by the prime mover and transmission means, the implement such as a snowblower, will be in an operable position so that its support housing will not be in contact with the surface of the terrain.

In FIGS. 1, 3, 4, and 5, the snowblower 46 is shown in detail. Snowblower 46 comprises a housing 54, and left and right augers 56 and 58, so that when augers 56 and 58 rotate, the snow is moved toward the center of housing 54. Augers 56 and 58 are rotated by chain 60 which passes over sprockets 61, 62, 63 and 64. Sprocket 64 is operatively connected to shaft 65 of auger reduction gear box 66. Shaft 67 of auger gear box 66 is connected to sprocket 68 and sprocket 69 is mounted on rotating shaft 70 intermediate its ends. Chain 71 passes over sprockets 68 and 69. Disposed at one end of shaft 70 is sprocket 72. Sprocket 73 is mounted on shaft 74 and chain 75 passes around sprockets 72 and 73. Shaft 74 is operatively connected to a power take-off drive means 76 which is operatively connected to the prime mover 42.

The snow discharge means which comprises fan assembly 78 is centered rearwardly of left and right augers 56 and 58 of housing 54. Mounted at the outer end of shaft 70 is spider or rotor 80 having spaced radial projections 82. Mounted on projections 82 are flanged scoops or projecting blades 84. Fan housing 86 is rotatably adjustable about shaft 70. Hydraulic cylinder and piston 91 is pivotally mounted at one end to the auxiliary frame 36 at 90 and at the other end to fan housing 86 at 89. Cylinder and piston 91 is hydraulically operated by levers, shown in dotted lines of FIG. 1, whereby the fan housing is shiftable axially about shaft 70. Outlet duct 88 of fan housing 86 is designed and constructed in a manner so that duct 88 is always tangent to the circumference of the circle formed by rotor 80 when rotating, whereby the snow ejected by flanged scoops or projecting blades 84 is propelled through duct 88.

When operating snowblower 46, the power take-off drive means 76 is operatively connected to prime mover 42. The drive means 76 is controlled independently of the hydrostatic transmission 22 by operating levers shown in dotted lines of FIG. 1. Thus, it is obvious that power supplied to snowblower 46 is not dependent on power supplied to transmission 22 so that maximum power can be supplied to snowblower 46 at near zero m.p.h. Drive means 76 rotates shaft 74 which in turn drives chain and sprocket assembly 92 to rotate shaft 70. Shaft 70 performs a dual function, namely to rotate spider 80 and drive chain and sprocket assembly 94.

Auger speed reduction gear box 66 is actuated by rotating shaft 67. Shaft 67 in turn, rotates shaft 65 which drives chain and sprocket assembly 95 and finally rotates augers 56 and 58. As stated previously, augers 56 and 58 convey snow toward the center of snowblower housing 54 which forces the snow into spider assembly 80 and ejects the snow through duct 88. To regulate the direction in which the snow is ejected through duct 88, hydraulic cylinder 91 shifts fan housing 86 to the desired position. More important, duct 88 is always tangent to the circumference of the rotating spider 80 thereby overcoming snow jamming of duct 88 and giving greater trajectory to the snow ejected.

It is obvious that many other tools or implements may be adapted to my self-propelled vehicle such as lawn mowers of the reel of rotary types, rotary brushes, leaf mulchers, plows or the like. Because my self-propelled vehicle has a front wheel drive on which the load is centered, and the power supplied to the vehicle is independent of the power supplied to the tool or implement by the prime mover, maximum over-all work efficiency is obtained in both the drive of the implement and the drive of the vehicle.

While I have illustrated by drawings and described in the specification a preferred embodiment of my invention, it should be clearly understood that my invention is not limited thereby except within the scope of the appended claims.

I claim:

1. A self-propelled vehicle of the type having a mounting for a snowblower or other implement at one end thereof which is shiftable between elevated and lowered positions comprising: a primary rigid frame extending longitudinally of the vehicle and having leading and trailing ends; a first wheel assembly including a supporting axle pivotally mounted on said frame adjacent the trailing end of said frame; a second wheel assembly including a supporting axle mounted on said frame adjacent the leading end of said frame; an auxiliary frame pivotally mounted at an intermediate portion of said primary frame and pivotally mounted on said second wheel assembly and having an outer end of said auxiliary frame projecting beyond the leading end of said primary frame and having the inner end overlapping the intermediate portion of said primary frame; said auxiliary frame having means thereon for supporting an implement such as a snowblower; a prime mover mounted on said auxiliary frame at an intermediate portion of said auxiliary frame between the second wheel assembly and the inner end of said auxiliary frame and serving as a counterbalance for said implement such that the weight distribution is essentially over the second wheel assembly; power transmission means; means connecting said power transmission means to said prime mover and said second wheel assembly to propel the vehicle; power take-off means mounted on said prime mover; means connecting said power take-off means to said implement whereby said implement is adapted to be operated while the vehicle is traveling substantially at zero miles per hour; and hydraulic operating means including a cylinder pivotally mounted on said primary frame and a piston pivotally mounted to said auxiliary frame so that when the piston moves within said cylinder said auxiliary frame is shifted between elevated and lowered positions.

2. A self-propelled vehicle of the type having a mounting for a snowblower or other implement as set forth in claim 1 wherein the snowblower or other implement comprises a support structure; snow conveying means including at least one shaft rotatably mounted on said supporting structure and also including a pair of left and right helical augers mounted adjacent opposite ends of the shaft; ejection means mounted on said supporting structure adjacent the center of said conveying means and said ejection means including a rotor having projecting blades for rotation about an axis extending longitudinally of the supporting structure and at right angles to said conveying means; drive means mounted on said supporting structure, connected to said prime mover and having means for connecting said drive means to both said conveying means and ejection means; and snow discharge means including a cylindrical housing disposed around the rotor of said ejection means and pivotally mounted for rotary adjustment on said axis thereof and having a discharge duct extending outwardly therefrom with its outer wall in tangential relationship therewith so that upon rotary adjustment of said discharge means the direction of said discharge duct can be changed while maintaining the same tangential relationship.

3. A self-propelled vehicle of the type having a mounting for a snowblower or other implement as set forth in claim 2 wherein said snow discharge means comprises a power means connected to said cylindrical housing for adjusting the direction of said discharge duct for controlling the direction of the discharge of the snow.

References Cited by the Examiner

UNITED STATES PATENTS

| | | | |
|---|---|---|---|
| 1,587,449 | 6/1926 | Wandscheer | 37—43 |
| 1,623,910 | 4/1927 | Curtis | 37—43 |
| 1,724,692 | 8/1929 | Bassler | 37—43 |
| 1,763,373 | 6/1930 | Schnell | 37—42 |
| 1,848,554 | 3/1932 | Smith | 37—43 |
| 1,891,428 | 12/1932 | Le Bleu | 37—140 |
| 1,977,871 | 10/1934 | Christopherson | 37—43 |
| 2,058,964 | 10/1936 | Dufour | 180—1.5 X |
| 2,221,546 | 11/1940 | Johnson | 180—1.5 |
| 2,428,131 | 9/1947 | Uebelhafer | 37—44 |
| 2,429,711 | 10/1947 | Dufour. | |
| 2,623,308 | 12/1952 | Laney | 37—43 |
| 2,669,039 | 2/1954 | Bunnell. | |
| 2,751,697 | 6/1956 | Bucher | 37—43 |
| 2,794,271 | 6/1957 | Wallace | 37—43 |
| 2,858,625 | 11/1958 | Rivinius. | |

FOREIGN PATENTS

| | | |
|---|---|---|
| 1,055,728 | 10/1953 | France. |
| 1,068,486 | 2/1954 | France. |
| 1,079,315 | 5/1954 | France. |
| 560,233 | 3/1944 | Great Britain. |
| 734,452 | 8/1955 | Great Britain. |

CHARLES E. O'CONNELL, *Primary Examiner.*

BENJAMIN HERSH, *Examiner.*